(12) United States Patent
Gilbert

(10) Patent No.: US 10,841,139 B2
(45) Date of Patent: Nov. 17, 2020

(54) O-QPSK SYMBOL TIMING ESTIMATION

(71) Applicant: Imagination Technologies Limited, Kings Langley (GB)

(72) Inventor: Matthew Gilbert, Bristol (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 16/457,950

(22) Filed: Jun. 29, 2019

(65) Prior Publication Data

US 2020/0007366 A1 Jan. 2, 2020

(30) Foreign Application Priority Data

Jun. 29, 2018 (GB) .................................. 1810789.6

(51) Int. Cl.
*H04L 27/20* (2006.01)
*H04L 27/00* (2006.01)
*H04L 27/26* (2006.01)

(52) U.S. Cl.
CPC ...... *H04L 27/2082* (2013.01); *H04L 27/0008* (2013.01); *H04L 27/0014* (2013.01);
(Continued)

(58) Field of Classification Search
CPC ............. H04L 27/2082; H04L 27/2627; H04L 27/0014; H04L 27/0008; H04L 2027/0083;
(Continued)

(56) References Cited

U.S. PATENT DOCUMENTS 5,485,489 A 1/1996 Chiba
6,075,408 A 6/2000 Kullstam et al.
(Continued)

OTHER PUBLICATIONS

Mueller et al., "Timing Recovery in Digital Synchronous Data Receivers," IEEE Transactions on Communications, vol. COM-24, No. 5, May 1976, pp. 516-531.
(Continued)

*Primary Examiner* — Jean B Corrielus
(74) *Attorney, Agent, or Firm* — Potomac Law Group, PLLC; Vincent M DeLuca

(57) ABSTRACT

Methods and systems for estimating a symbol timing error for an offset quadrature phase shift keying (O-QPSK) modulated signal. The method includes: receiving a plurality of complex samples representing an O-QPSK modulated signal, wherein if the O-QPSK modulated signal is sampled on time each of the plurality of samples has substantially no imaginary component; generating an early error metric and a late error metric for each sample, the early error metric based on the imaginary component for the sample and a sign of a real component of a previous sample and the late error metric based on the imaginary component for the sample and a sign of a real component of a next sample; generating a combined early error metric based on the early error metrics for the plurality of samples; generating a combined late metric based on the late error metrics for the plurality of samples; and generating an estimate of the symbol timing error based on the combined early error metric and the combined late metric.

20 Claims, 13 Drawing Sheets

(52) U.S. Cl.
CPC .. *H04L 27/2627* (2013.01); *H04L 2027/0026* (2013.01); *H04L 2027/0083* (2013.01)

(58) Field of Classification Search
CPC ......... H04L 2027/0026; H04L 27/2662; H04L 27/2271
See application file for complete search history.

(56) References Cited

U.S. PATENT DOCUMENTS

| | | | | |
|---|---|---|---|---|
| 6,556,615 | B1* | 4/2003 | Pon | G01S 19/22 |
| | | | | 375/130 |
| 2006/0045171 | A1* | 3/2006 | Ryu | H04B 1/7085 |
| | | | | 375/148 |
| 2007/0058752 | A1* | 3/2007 | Ke | H04L 27/0014 |
| | | | | 375/316 |
| 2015/0222419 | A1* | 8/2015 | Bachmann | H03L 7/08 |
| | | | | 375/327 |
| 2016/0006478 | A1* | 1/2016 | Bruchner | H04B 1/709 |
| | | | | 375/150 |

OTHER PUBLICATIONS

Designing an OQPSK demodulator, Jonti, 2016, downloaded from http://jontio.zapto.org/hda1/oqpsk.html.

* cited by examiner

| | 0 | 1 | 2 | 3 | 4 | 5 | 6 | 7 | |
|---|---|---|---|---|---|---|---|---|---|
| Data Stream | 1 | 1 | 0 | 1 | 1 | 0 | 0 | 1 | 1 |
| Transmitted I/Q | 1 | 0+j | -1 | 0+j | 1 | 0-j | -1 | 0+j | |
| I/Q Samples (Rx) | 1+aj | -a+j | -1+aj | a+j | 1-aj | -a-j | -1+aj | a+j | |
| Rotated I/Q Samples (Rx) | 1+aj | 1+aj | 1-aj | -1+aj | 1-aj | -1+aj | 1-aj | -1+aj | |
| eLate | a | a | a | a | a | a | a | a | |
| eLateAccum | a | 2a | 3a | 4a | 5a | 6a | 7a | 8a | |
| eEarly | -a | -a | a | -a | -a | -a | -a | -a | |
| eEarlyAccum | -a | -2a | -a | -2a | -3a | -4a | -5a | -6a | |

FIG. 11

O-QPSK SYMBOL TIMING ESTIMATION

BACKGROUND

As is known to those of skill in the art, phase shift keying (PSK) is a modulation technique in which data is conveyed by changing (modulating) the phase of a constant frequency reference signal (the carrier wave). Offset-Quadrature PSK (O-QPSK), which may also be referred to as staggered QPSK (S-QPSK) is a variant of PSK in which an O-QPSK signal is generated by modulating two orthogonal carriers cos(wt) and −sin(wt) with two independent half-speed data signals which correspond to the in-phase and quadrature components of a baseband signal, respectively and these modulated carriers are added to form an O-QPSK modulated signal. In contrast to QPSK, where the in-phase and quadrature components are aligned, in O-QPSK the quadrature component is offset from the in-phase component by one bit period.

FIG. 1 illustrates an example O-QPSK modulator 100 for generating an O-QPSK modulated signal. The example O-QPSK modulator 100 comprises a 2-bit serial to parallel converter 102, a delay block 104, two pulse-shaping filters 106, 108, two mixers 110, 112, and an adder 114. The 2-bit serial to parallel converter 102 (which also may be referred to as a demultiplexer) receives a stream of bits to be transmitted and splits the bits into two streams. Specifically, the even bits form an in-phase component square waveform signal $I_{sw}(t)$, and the odd bits form a quadrature component square waveform signal $Q_{sw}(t)$. The quadrature component square waveform signal $Q_{sw}(t)$ is then delayed by the delay block 104 by one bit period $T_B$ to produce a delayed quadrature component square waveform signal $Q_{sw}(t-T_B)$. An example of an in-phase component square wave signal $I_{sw}(t)$ 202 and an example delayed quadrature component square wave signal $Q_{sw}(t-T_B)$ 204 corresponding to an example bit stream 206 are shown in FIG. 2. It can be seen in FIG. 2 that the delay imposed on the quadrature signal guarantees that the in-phase component and quadrature component are never changing at the same time. This limits any phase transition in the O-QPSK modulated signal to ±90 degrees.

The in-phase component square wave signal $I_{sw}(t)$ and the delayed quadrature component square wave signal $Q_{sw}(t-T_B)$ are then passed through respective pulse-shaping filters 106, 108 (e.g. low pass filters) to generate pulse-shaped in-phase and quadrature component signals $I_{ps}(t)$ and $Q_{ps}(t-T_B)$. In some cases, the pulse-shaping filters 106, 108 are configured to apply half-sine pulse shaping. The pulse-shaping smooths the transitions between bits. Examples of the pulse-shaped in-phase and quadrature component signals $I_{ps}(t)$ 302 and $Q_{ps}(t-T_B)$ 304 generated from the square waveforms of FIG. 2 by a half-sine pulse shaping filter are shown in FIG. 3. The pulse-shaped in-phase and quadrature component signals $I_{ps}(t)$ and $Q_{ps}(t-T_B)$ are mixed with orthogonal cosine and sine signals via mixers 110, 112 to generate modulated carrier signals which are combined via adder 114 to generate an O-QPSK modulated signal. In this manner each bit is transmitted as an O-QPSK symbol. The O-QPSK modulated signal is then provided to a transmitter back-end system (not shown) where it is up converted to a transmission frequency and coupled to a transmission antenna for radio frequency (RF) transmission.

Since the RF signal received at an O-QPSK receiver is typically a distorted version of the signal transmitted by the transmitter due to noise etc. the receiver typically has to estimate the transmitted O-QPSK symbol sequence from the received signal. An example O-QPSK receiver 400 is shown in FIG. 4 and comprises an antenna 402, an RF front-end circuit 404 and a baseband circuit 406. The antenna 402 captures an RF O-QPSK modulated signal and provides the captured signal to the RF front-end circuit 404. The RF front-end circuit 404 down-converts the signal (e.g. via a down-converter 408) to a complex baseband signal (i.e. to an in-phase component signal and a quadrature-phase component signal) and digitises the complex baseband signal (e.g. via an analog to digital converter (ADC) 410) to generate a series of IQ samples that represent the received signal. It will be evident to a person of skill in the art that the RF front-end circuit 404 may additionally comprise other components not shown in FIG. 4 to perform other functions such as, but not limited to, filtering and automatic gain control.

The IQ samples generated by the RF front-end circuit 404 are provided to the baseband circuit 406 which generates an estimate of the transmitted O-QPSK symbols from the IQ samples. The baseband circuit 406 typically comprises a resample circuit 412 which re-samples the IQ samples generated by the RF front-end circuit 404 for processing by the baseband circuit 406. For optimal decoding the receiver 400 needs to accurately measure and track the timing of the received O-QPSK symbols. Accordingly, the baseband circuit 406 typically comprises a symbol timing estimation circuit 414 which monitors the output of the resample circuit 412 to detect errors in the sampling timing and to generate an adjustment signal to cause the resample circuit 412 to adjust the timing of the sampling. The baseband circuit 406 may also comprise a detector 416 which is configured to estimate the transmitted O-QPSK symbols from the IQ samples. Where the original data was encoded by, for example, an error correction code (ECC) the estimated symbol sequence is provided to a decoder 418 which is configured to decode the original data stream from the estimated symbol sequence. It will be evident to a person of skill in the art that the baseband circuit 406 may additionally comprise other components not shown in FIG. 4 to perform other functions such as, but not limited to, carrier synchronisation.

There are many known techniques for measuring and tracking the timing of the received symbols, but they typically either require the received signal to be oversampled (i.e. to be sampled such that there is more than one sample per O-QPSK symbol) which directly affects the receiver power; or, are complex to implement in hardware. O-QPSK is often used in low-cost, low-complexity systems, such as systems that operate in accordance with IEEE 802.15.4. As is known to those of skill in the art, IEEE 802.15.4 is a technical standard that defines operation of low-rate wireless personal area networks (LR-WPANs). It focuses on low-cost, low-speed ubiquitous communications between devices. It can be contrasted with other wireless standards, such as Wi-Fi®, which offer more bandwidth and require more power. IEEE 802.15.4 is the basis for ZigBee®, Wireless HART, RF4CE, MiWi, ISA100.11a, and 6LoW-PAN. Generally, the more accurately the sample timing error can be estimated (and thus corrected), the lower the received signal power can be. The trade-off is often then between receiver performance and the complexity of the receiver. Accordingly, it is desirable, particularly in these types of systems, to perform symbol timing synchronisation in a simple, yet accurate manner.

The embodiments described below are provided by way of example only and are not limiting of implementations which solve any or all of the disadvantages of known O-QPSK receivers and/or known methods of performing symbol timing synchronisation on an O-QPSK modulated signal.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are methods and systems for estimating a symbol timing error for an offset quadrature phase shift keying (O-QPSK) modulated signal. The method includes: receiving a plurality of complex samples representing an O-QPSK modulated signal, wherein if the O-QPSK modulated signal is sampled on time each of the plurality of samples has substantially no imaginary component; generating an early error metric and a late error metric for each sample, the early error metric based on the imaginary component for the sample and a sign of a real component of a previous sample and the late error metric based on the imaginary component for the sample and a sign of a real component of a next sample; generating a combined early error metric based on the early error metrics for the plurality of samples; generating a combined late metric based on the late error metrics for the plurality of samples; and generating an estimate of the symbol timing error based on the combined early error metric and the combined late error metric.

A first aspect provides a computer-implemented method of estimating a symbol timing error for an offset quadrature phase shift keying "O-QPSK" modulated signal, the method comprising: receiving a set of complex samples representing the O-QPSK modulated signal, wherein if the O-QPSK modulated signal is sampled on time each sample in the set of complex samples has substantially no imaginary component; generating an early error metric and a late error metric for each sample in the set of complex samples, the early error metric based on the imaginary component for the sample and a sign of a real component of a previous sample and the late error metric based on the imaginary component for the sample and a sign of a real component of a next sample; generating a combined early error metric based on the early error metrics for the samples in the set of complex samples; generating a combined late error metric based on the late error metrics for the samples in the set of complex samples; and generating an estimate of the symbol timing error based on the combined early error metric and the combined late error metric.

A second aspect provides an offset quadrature phase shift keying "O-QPSK" symbol timing estimation system comprising: an early error metric generator configured to generate an early error metric for each sample in a set of complex samples that represent an O-QPSK modulated signal, wherein when the O-QPSK modulated signal is sampled on time each sample in the set of complex samples comprises substantially no imaginary component, the late error metric based on an imaginary component of the sample and a sign of a real component of a previous sample; a late error metric generator configured to generate a late error metric for each sample in the set of complex samples, the late error metric based on an imaginary component of the sample and a sign of a real component of a next sample; an early error metric combination module configured to generate a combined early error metric based on the early error metrics for the samples in the set of complex samples; a late error metric combination module configured to generate a combined error metric based on the late error metrics for the samples in the set of complex samples; and a sample timing error estimation module configured to estimate a sample timing error based on the early and late combined error metrics.

A third aspect provides an offset quadrature phase shift keying "O-QPSK" receiver comprising: the O-QPSK symbol timing estimation system of the second aspect; and a phase rotator configured to: receive an initial set of complex samples that represent the O-QPSK modulated signal, wherein when the O-QPSK modulated signal is sampled on time one or more of the complex samples in the initial set of complex samples comprises substantially no real component; and generate the set of complex samples from the initial set of complex samples by rotating the one or more complex samples in the initial set of complex samples so that when the O-QPSK modulated signal is sampled on time the one or more complex samples have substantially no complex component.

The O-QPSK symbol timing estimation systems and O-QPSK receivers described herein may be embodied in hardware on an integrated circuit. There may be provided a method of manufacturing, at an integrated circuit manufacturing system, the O-QPSK timing error systems and O-QPSK receivers described herein. There may be provided an integrated circuit definition dataset that, when processed in an integrated circuit manufacturing system, configures the system to manufacture the O-QPSK symbol timing estimation systems and O-QPSK receivers described herein. There may be provided a non-transitory computer readable storage medium having stored thereon a computer readable description of an O-QPSK symbol timing estimation system or an O-QPSK receiver described herein that, when processed in an integrated circuit manufacturing system, causes the integrated circuit manufacturing system to manufacture an integrated circuit embodying an O-QPSK symbol timing estimation system or the O-QPSK receiver.

There may be provided an integrated circuit manufacturing system comprising: a non-transitory computer readable storage medium having stored thereon a computer readable description of the O-QPSK symbol timing estimation system or O-QPSK receiver described herein; a layout processing system configured to process the computer readable description so as to generate a circuit layout description of an integrated circuit embodying the O-QPSK symbol timing estimation system or O-QPSK receiver; and an integrated circuit generation system configured to manufacture the symbol timing estimation system or the O-QPSK receiver according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 11 is a schematic diagram illustrating an example application of the method of FIG. 10 for an example O-QPSK symbol stream;

Figure 1:
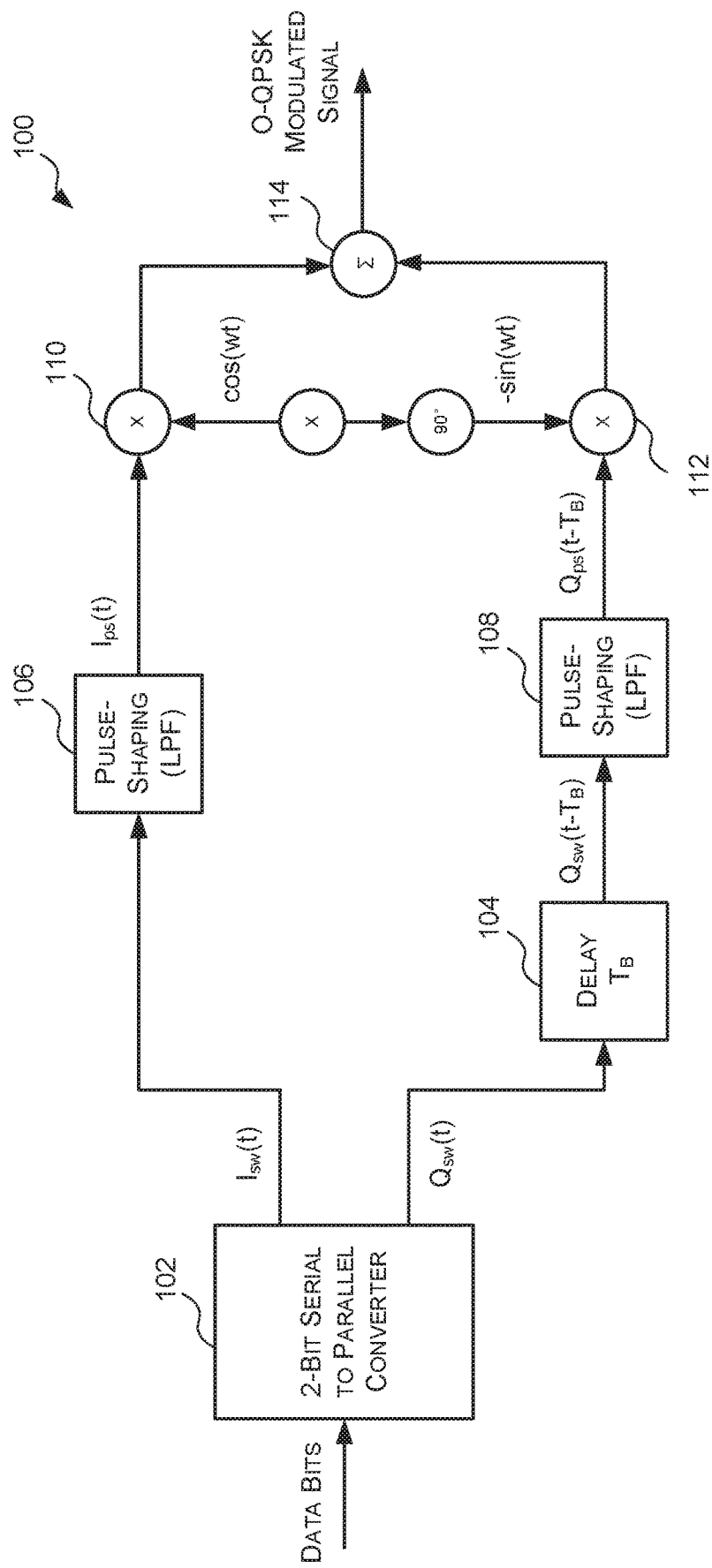
FIG. 1 is a block diagram of an example O-QPSK modulator.
Figure 2:
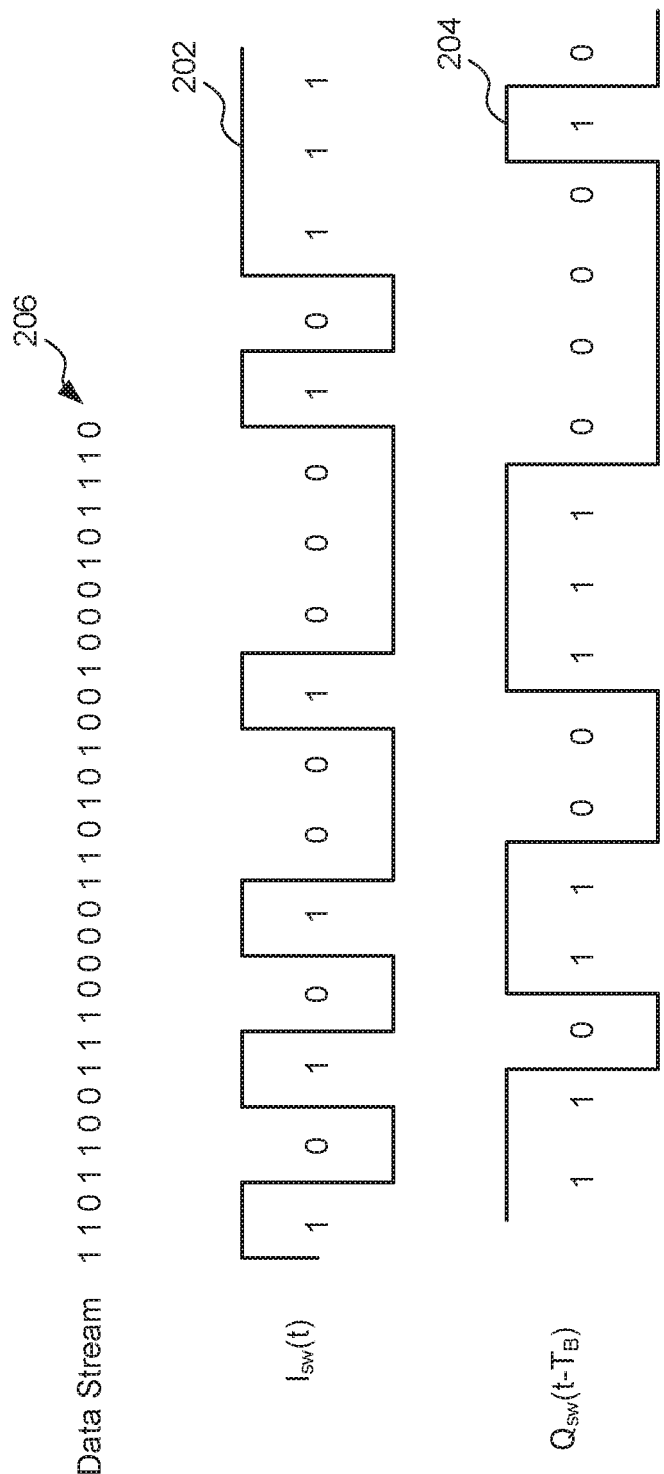
FIG. 2 is a schematic diagram illustrating example in-phase and quadrature component square waveforms for an example bit stream.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

Described herein are O-QPSK symbol timing estimation systems, and methods, for measuring and tracking the timing of receiving symbols in an O-QPSK modulated signal wherein an estimated timing error is generated by: receiving a plurality of complex samples representing the received O-QPSK modulated signal which if sampled on time have substantially no imaginary component; generating an early error metric and a late error metric for each sample, the early error metric based on the imaginary component for the sample and a sign of the real component a previous sample and the late metric based on the imaginary component for the sample and a sign of a real component of a next sample; generating a combined early error metric based on the early error metrics for the plurality of samples; generating a combined late metric based on the late error metrics for the plurality of samples; and generating an estimate of the error based on the combined early error metric and the combined late metric. Such a method of has proven to accurately measure and track the timing of received symbols, and be capable of being efficiently implemented in hardware.

Figure 3:
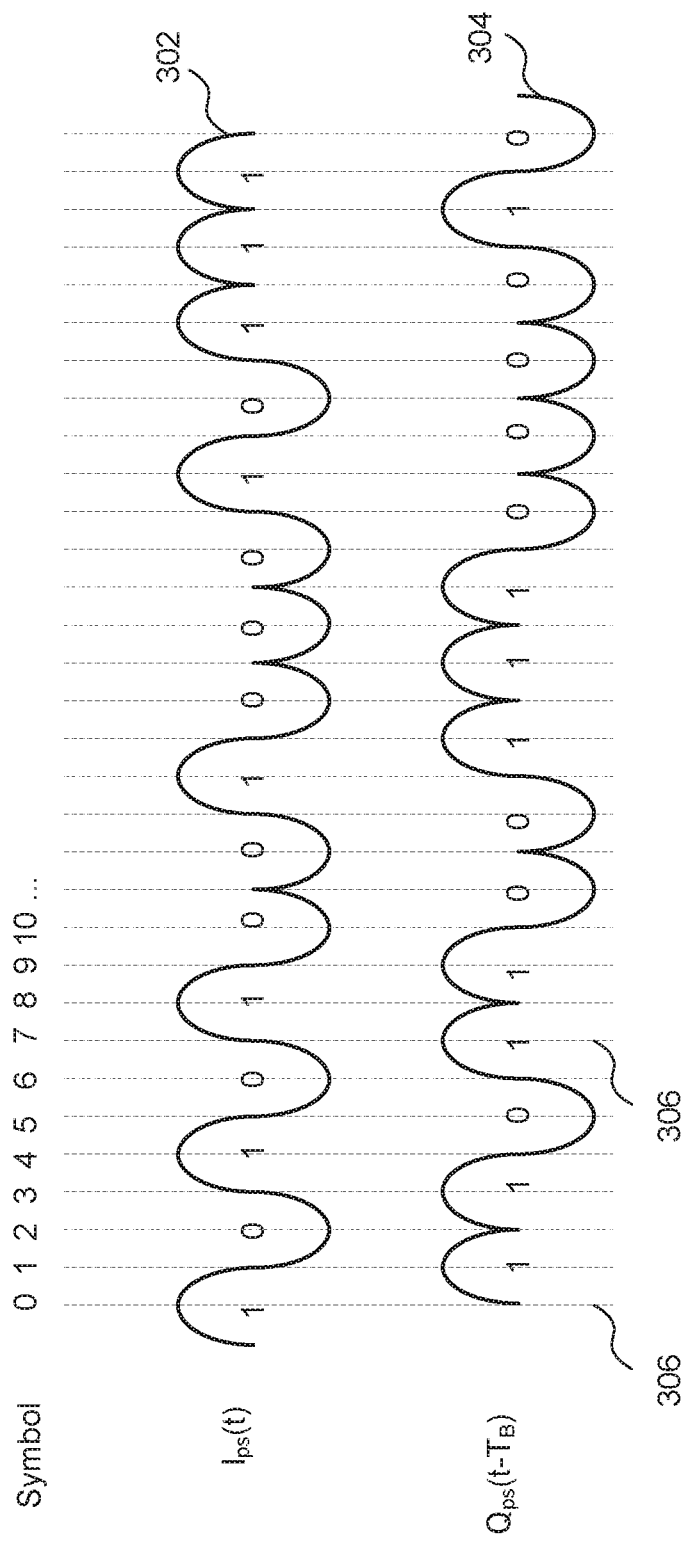
FIG. 3 is a schematic diagram illustrating example pulse-shaped versions of the in-phase and quadrature component square waveforms of FIG. 2.
Figure 4:
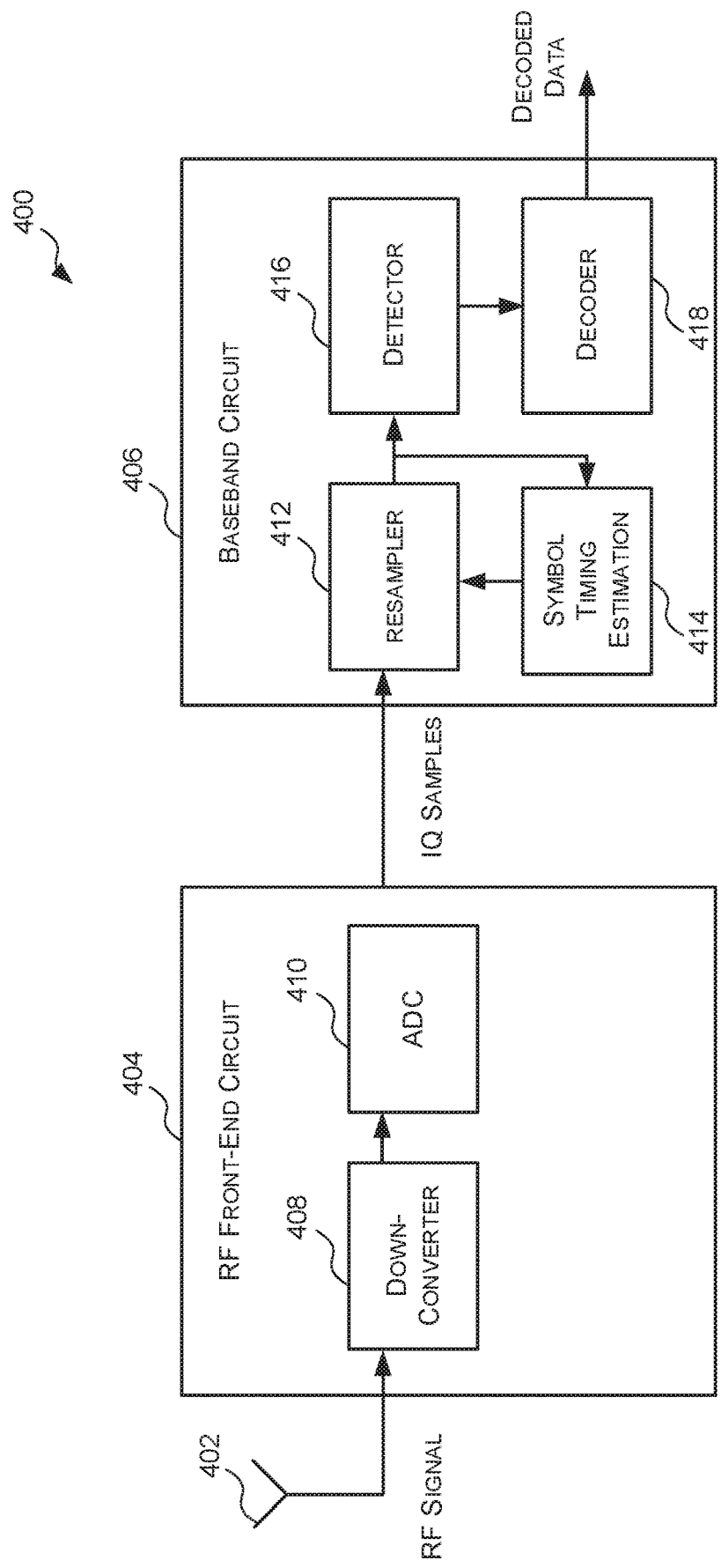
FIG. 4 is a block diagram of an example O-QPSK receiver.

The in-phase and quadrature signals representing a baseband version of a received O-QPSK modulated signal are said to be sampled "on-time" when they are sampled at the peaks of the in-phase and quadrature signals (i.e. at the instances marked as 306 in FIG. 3). It can be seen in FIG. 3 that when the in-phase and quadrature signals 302, 304 are sampled on time the even samples will have a peak in the in-phase component and the odd samples will have a peak in the quadrature component. It also can be seen in FIG. 3 that when the in-phase component has a peak, the quadrature component is zero. Similarly, when the quadrature component has a peak, the in-phase component is zero. Accordingly, when the in-phase and quadrature signals are sampled on-time the even samples will be all real and the odd-samples will be all imaginary.

Figure 5:
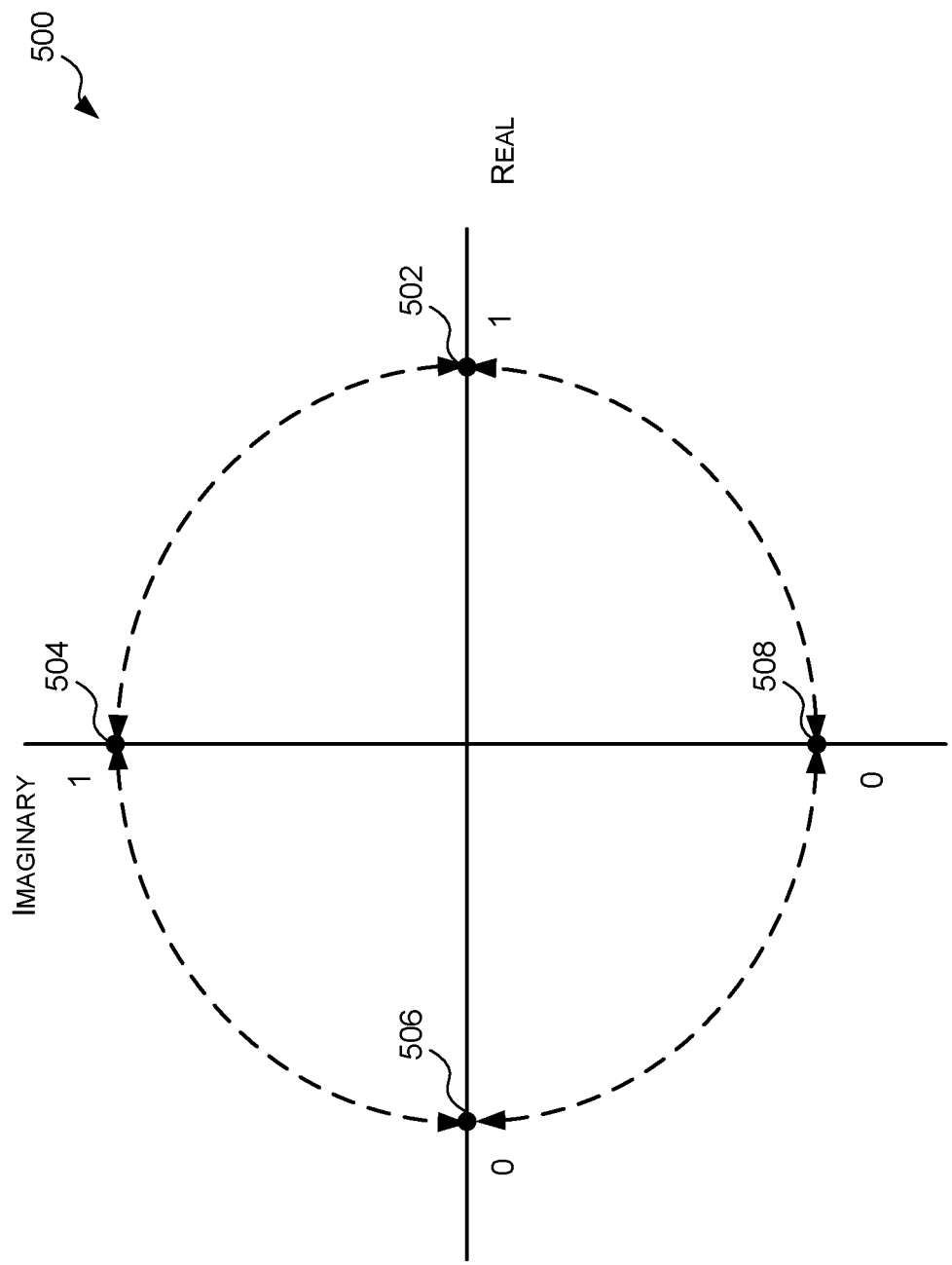
FIG. 5 is a schematic diagram illustrating an O-QPSK constellation diagram.

This is illustrated in the O-QPSK constellation diagram 500 shown in FIG. 5. Specifically, the constellation diagram 500 shows that in O-QPSK information is transmitted as one of four symbols 502, 504, 506, 508 each representing 1-bit of data. Each symbol is encoded as a different phase shift of the carrier wave. Specifically, an even-numbered symbol at a 0 degree phase shift is interpreted as a '1', and an even-numbered symbol at a 180 degree phase shift is interpreted as a '0'. Similarly, an odd-numbered symbol at a 90 degree phase shift is interpreted as a '0' and an odd-numbered symbol at a 270 degree phase shift is interpreted as a '1'. The dotted arrows indicate the valid symbol transitions.

Accordingly, when there is an error in the symbol timing it will manifest itself as an imaginary component in even samples and as a real component in odd samples. An example of late sampling a symbol sequence of 1 (even)—1 (odd)—0 (even)—is illustrated in the constellation diagram 600 FIG. 6. It can be seen in FIG. 6 that if the sample corresponding to 1 (even) is sampled late (e.g. at point 602) there will be a positive real component RE.1 and a positive imaginary component IM.1 instead of just a real component. Similarly, if the sample corresponding to 1 (odd) is sampled late (e.g. at point 604) there will be a positive imaginary component IM.2 and a negative real component RE.2 instead of just an imaginary component. An example of early sampling of a symbol sequence of −1 (even)—1 (odd)—0 (even) where the first symbol is preceded by a 0 (odd), is illustrated in the constellation diagram 700 of FIG. 7. It can be seen in FIG. 7 that if the first symbol—1 (even)—is sampled early (e.g. at point 702) there will be a positive real component RE.3 and a negative imaginary component IM.3 instead of just a real component. Similarly, if the second symbol—1 (odd)—is sampled early (e.g. at point 704) there will be a positive real component RE.4 and a positive imaginary component IM.4 instead of just an imaginary component.

Figure 8:
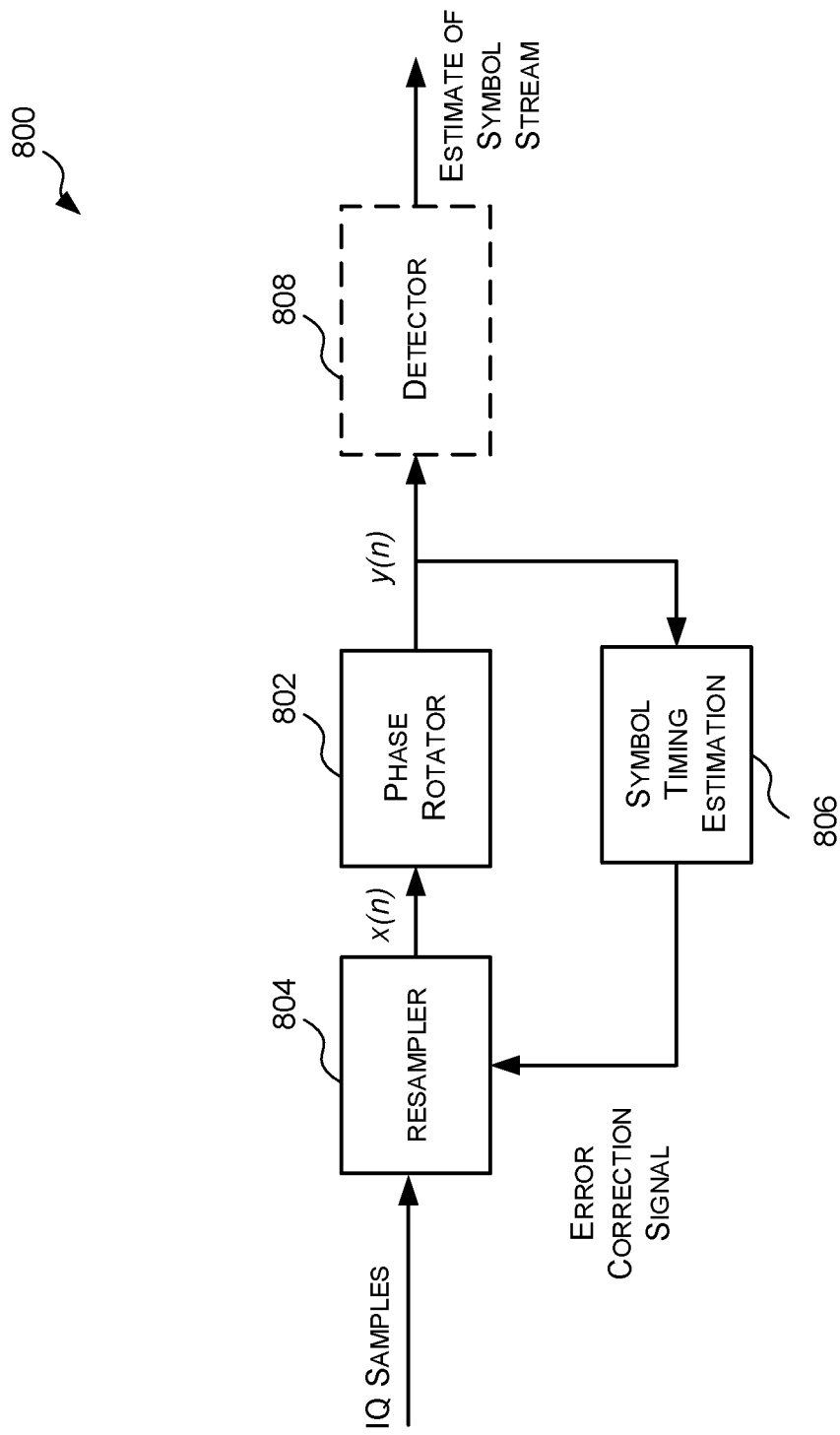
FIG. 8 is a block diagram of a portion of an example O-QPSK demodulator comprising a phase-rotator after the resampler.

However, an O-QPSK receiver can be simplified by applying a phase shift to the odd samples so that they lie on the real axis (when sampled on-time). Reference is now made to FIG. 8 which illustrates part of an O-QPSK receiver 800 which comprises a phase rotator 802 that follows a resample circuit 804. As described above, the resample circuit 804 receives IQ samples from the RF front-end circuit (e.g. RF front-end circuit 404) and re-samples them for processing by the baseband circuit. Typically, the RF front-end circuit samples the in-phase and quadrature signals that represent the received RF signal at a fixed sample rate that is higher than the O-QPSK symbol rate. The resample circuit 804 then samples the received IQ samples at the O-QPSK symbol rate.

The phase rotator 802 is configured to apply a phase rotation to the odd samples so as to place them on the real axis (when sampled on-time). In some cases, the phase rotator 802 may be configured to apply a phase shift of ±90 degrees to only the odd samples. In other cases, the phase rotator 802 may be configured to apply a phase rotation of (k mod 4)*90 degrees to each sample where k is the sample number. This results in the even samples being rotated by 0 degrees or 180 degrees so that they remain on the real axis, and the odd samples being rotated by 90 degrees or 270 degrees so that will lie on the real axis as shown in Table 1. In some cases, it may be simpler to implement in hardware a phase rotator that applies a phase rotation to every sample, than a phase rotator that applies a phase rotation to only the odd samples. It will be evident to a person of skill in the art, that this is an example only and that the phase rotator 802 may be implemented in another manner.

TABLE 1

| k mod 4 | Phase Shift |
|---------|-------------|
| 0 | 0 degrees |
| 1 | 90 degrees |
| 2 | 180 degrees |
| 3 | 270 degrees |

The phase rotated samples y(n) are then provided to: a detector 808 to estimate the transmitted O-QPSK symbols from the phase rotated samples; and the symbol timing estimation system 806 to determine whether the symbols are being sampled on-time, early or late. Once the odd components have been rotated to lie on the real axis (when sampled on-time) then an error in the symbol timing will manifest itself in any sample as an imaginary component. The direction of the error can then be determined by comparing the sign of the imaginary component to the sign of the real component of the previous and next samples.

Figure 6:
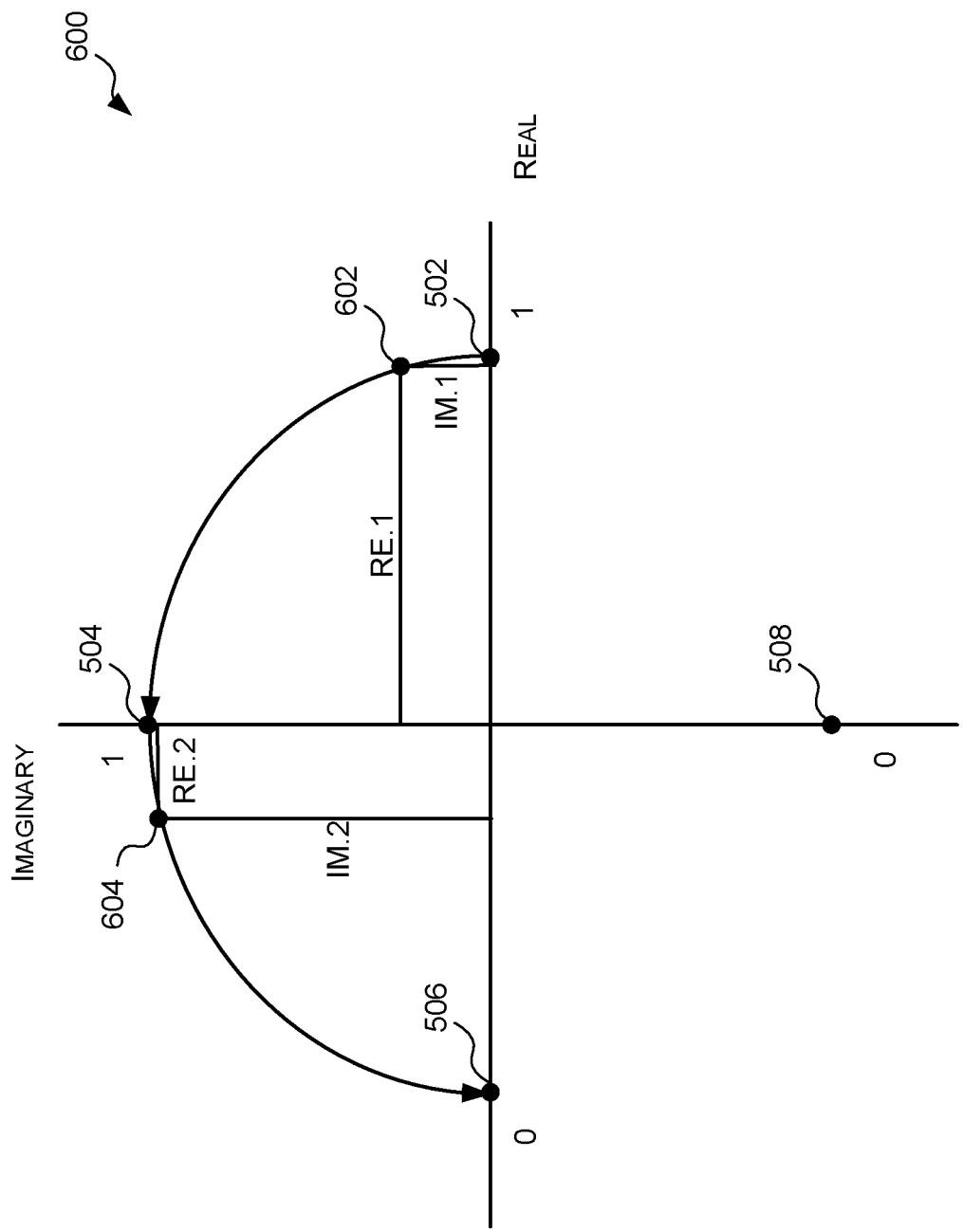
FIG. 6 is a schematic diagram illustrating late sampling of O-QPSK symbols.

Specifically, if the $k^{th}$ un-rotated sample x(k) is late then it will pick up part of the next symbol so the sign of the error component of the sample x(k) (i.e. the imaginary component for even samples and the real component for odd samples) will match the sign of the non-error component of the next sample x(k+1) (i.e. the real component for even samples and the imaginary component for odd samples). For example, as shown in FIG. 6, if x(k) is a 1 (even) and x(k+1) is a 1 (odd) and x(k) is sampled late (e.g. at point 602) then the error component (imaginary component IM.1) of x(k)) will be positive since the non-error component (imaginary component IM.2) of x(k+1) is positive.

If the sign of the error component of an un-rotated sample x(k) matches the sign of the non-error component of the next un-rotated sample x(k+1) then after the samples are rotated in accordance with the method described with respect to Table 1, the sign of the error component of the corresponding rotated sample y(k) (i.e. imaginary component) and the sign of the non-error component of the next rotated sample y(k+1) (i.e. the real component) will also match. Therefore, an error metric eLate (k), calculated according to equation (1), will be positive for all k when the sampling is late:

$$eLate(k)=\text{sign}(\text{real}(y(k+1))*\text{imag}(y(k))) \quad (1)$$

Figure 7:
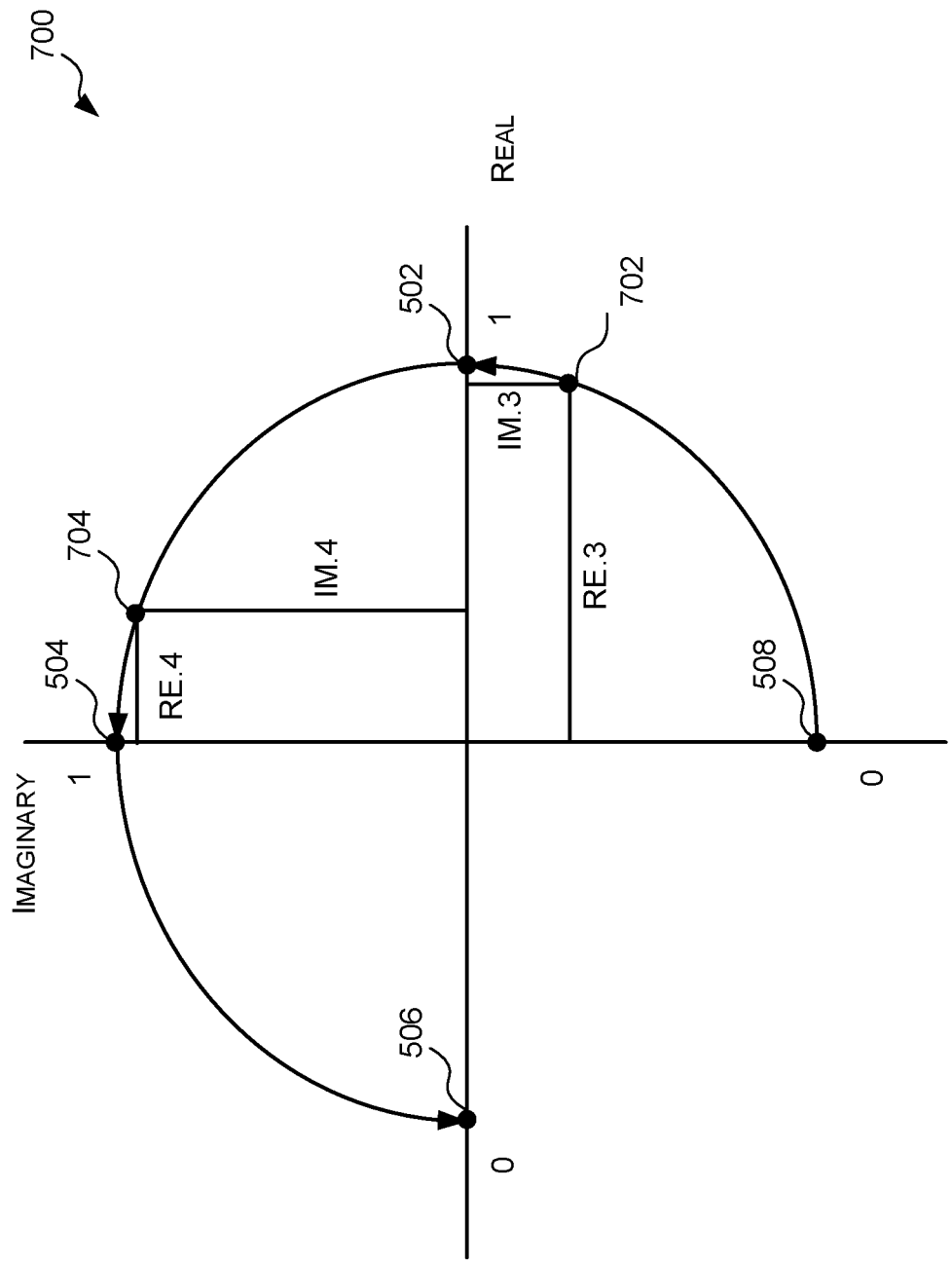
FIG. 7 is a schematic diagram illustrating early sampling of O-QPSK symbols.

Conversely, if the $k^{th}$ un-rotated sample x(k) is early then it will include part of the previous symbol so that the sign of the error component of the sample x(k) (i.e. the imaginary component for even samples and the real component for odd samples) will match the sign of the non-error component of the previous sample x(k−1) (i.e. the real component for even samples and the imaginary component for odd samples). For example, as shown in FIG. 7, if x(k) is a 1(even) and x(k−1) is a 0 (odd) and x(k) is sampled early (e.g. at point 702) then the error component (imaginary component IM.3) of x(k) will be negative since the non-error component (imaginary component) of x(k−1) is negative.

If the sign of the error component of an un-rotated sample x(k) matches the sign of the non-error component of the previous un-rotated sample x(k−1) then after the samples are rotated in accordance with the method described with respect to Table 1, then the sign of the error component (the imaginary component) of the corresponding rotated sample y(k) will not match the sign of the non-error component (the real component) of the next rotated sample y(k). Therefore, an early error metric eEarly(k), calculated according to equation (2), will be positive for any k when the sampling is early.

$$eEarly(k)=\text{sign}(\text{real}(y(k-1))*-\text{imag}(y(k))) \quad (2)$$

However, an instantaneous error metric e(k) based on a comparison of eEarly(k) and eLate(k), such as that shown in equation (3), will not provide a fool proof indication of the direction of the sampling error (i.e. whether the sampling is early or late).

$$e(k)=\text{abs}(eEarly(k)-eLate(k)) \quad (3)$$

This is because when the sampling is late, the early error metric eEarly may be positive or negative, and when the sampling is early the late metric eLate may be positive or negative. Specifically, when the signs of the non-error components of un-rotated samples x(k−1) and x(k+1) (i.e. the real components for even samples and imaginary components for odd samples) are different, the sign of the error component of x(k) (i.e. the imaginary component for even samples and the real component for odd samples) will only match one of them so that only one of the early and late metrics eEarly(k), eLate(k) will be positive. This will occur when the path from x(k−1) to x(k) is in the same direction in the constellation map (i.e. clockwise or counter-clockwise) as the path from x(k) to x(k+1). In contrast, when the signs of the non-error components of x(k−1) and x(k+1) (i.e. the real components for even samples and imaginary components for odd samples) are the same, the sign of the error component of x(k) will match both of them so that both of the early and late metrics eEarly(k), eLate(k) will be positive. This will occur when the path from x(k−1) to x(k) is in a different direction in the constellation map (i.e. clockwise or counter-clockwise) from the path from x(k) to x(k+1).

Accordingly, in some cases (i.e. when the signs of the non-error components of x(k−1) and x(k+1) are different) the instantaneous error metric e(k) of equation (3) will provide useful information—i.e. it will be negative when the sampling is late and positive when the sampling is early and the magnitude indicates the amount of the error. However, in other cases (i.e. when the signs of the non-error components of x(k−1) and x(k+1) are the same) the instantaneous error metric e(k) of equation (3) will not provide any useful information as it will be zero.

However, if it is known in advance that for every X number of symbols that there will be at least one sample x(k) where the signs of the non-error components of x(k−1) and x(k+1) will match, and there will be at least one sample x(k) where the signs of the non-error components of x(k−1) and x(k+1) will not match then an accurate error metric may be generated by: accumulating the early error metrics eEarly(k) over X samples as shown in equation (4) to generate an accumulated early error metric eEarlyaccum; accumulating the late error metrics over X samples as shown in equation (5) to generate an accumulated late error metric eLateaccum; and determining the sampling to be early when the accumulated early error metric eEarlyaccum is greater than the accumulated late error metric eLateaccum, and determining the sampling to be late when the accumulated late error metric eLateaccum is greater than the accumulated early error metric eEarlyaccum, wherein X is an integer greater than or equal to 2.

$$eEarlyaccum = \Sigma_{k=0}^{X-1} eEarly(k) \quad (4)$$

$$eLateaccum = \Sigma_{k=0}^{X-1} eLate(k) \quad (5)$$

This will provide an accurate estimate of the direction of the sampling error because if the sampling is early then every early error metric eEarly(k) will be positive thus summing the early error metrics for each sample x(k) in X will produce a large number. As for the late error metrics, since there will be at least one sample x(k) in the set of X samples where the signs of the non-error components of x(k−1) and x(k+1) match, and there will be at least one sample x(k) in the set of X samples where the signs of the non-error components of x(k−1) and x(k+1) do not match then at least one of the late error metrics eLate(k) will be positive and at least one of the late error metrics eLate(k) will be negative. This means that the late error metrics will sum to a smaller value than the early error metrics, assuming the magnitude of the error is roughly the same for each sample.

Similarly, if the sampling is late then every late error metric eLate(k) will be positive thus summing the late error metrics for each sample y(k) in X will produce a large number. As for the early error metrics, since there will be at least one sample x(k) in the set of X samples where the signs of the non-error components of x(k−1) and x(k+1) match, and there will be at least one sample y(k) in the set of X samples where the signs of the non-error components of y(k−1) and y(k+1) will not match, then at least one of the early error metrics eEarly(k) will be positive and at least one of the early error metrics eEarly(k) will be negative. This means that the early error metrics will sum to a smaller value than the late error metrics, assuming the magnitude of the error is roughly the same for each sample.

The sign and magnitude of the sampling timing error can be determined from the accumulated early error metric and the accumulated late error metric. For example, where the accumulated early error metric is larger than the accumulated late error metric then the sample timing is early. In contrast, where the accumulated late error metric is larger than the accumulated early error metric then the sample timing is late. In some cases, the magnitude of the timing error may be determined to be the difference between the two accumulated metrics. In other cases, the magnitude of the timing error may be determined to be the larger of the two accumulated metrics.

In some cases, the difference between the accumulated error metrics may be determined, for example, as shown in equation (6) and the direction of the sampling error may be determined based on whether the difference between the accumulated error metrics is negative or positive.

$$eaccum = abs(eEarlyaccum) - abs(eLateaccum) \quad (6)$$

Figure 9:
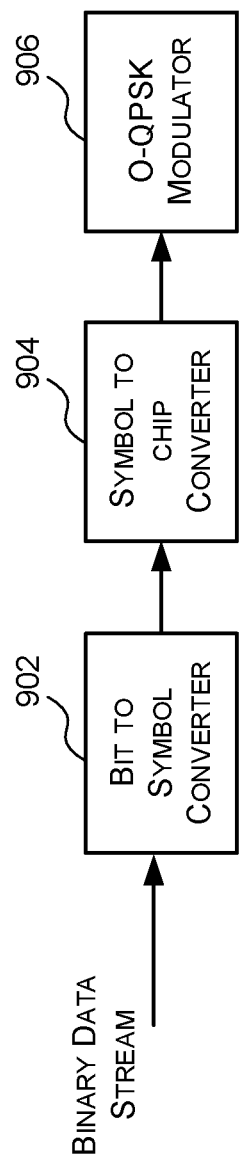
FIG. 9 is a block diagram of a system for generating an IEEE 802.15.4 compliant signal from a binary bit stream.

An example of a system where it is known in advance that for every predetermined number of symbols X that there will be at least one sample x(k) where the signs of the non-error components of x(k−1) and x(k+1) are the same and at least one sample x(k) where the signs of the non-error components of x(k−1) and x(k+1) are different is a system that conforms with the IEEE 802.15.4 standard. FIG. 9 illustrates an example system 900 for generating an IEEE 802.15.4 signal from a data stream. The data stream to be transmitted is divided (via converter 902) into 4-bit symbols (i.e. the binary stream is grouped into blocks of 4-bits). Then each four-bit symbol is converted into a sequence of 32 chips (via converter 904). The 32-chip sequences are then provided to an O-QPSK modulator 906 such as the O-QPSK modulator 100 of FIG. 1 where they are used to modulate a carrier signal. Each 32-bit chip is a quasi-orthogonal pseudonoise code (PN-Code). As is known to those of skill in the art, a PN-code has a spectrum similar to a random sequence of bits but is deterministically generated. Based on this it is known that for any sequence of 32-bits (which correlate to 32 O-QPSK symbols) there will be at least one sample x(k) wherein the signs of the non-error components of x(k−1) and y(k+1) are the same, and there will be at least one sample x(k) wherein the sign of the non-error components of x(k−1) and x(k+1) are different. Thus for IEEE 802.15.4 X=32 or any multiple thereof.

While the early and late error metrics may be generated for one sample each sample cycle this would require processing three samples each cycle—y(k−1), y(k) and y(k+1). The Applicant has identified that the calculation of the early and late error metrics can be implemented more efficiently in hardware by calculating, each sample cycle, the early error metric for the current sample and the late error metric for the previous sample. In this way, only two samples are processed each cycle—the sample received in the current cycle and the sample received in the previous cycle—yet over X samples X early and late metrics will be calculated. In these cases each cycle eLate may be calculated in accordance with equation (1) where k is the current sample and eEarly may be calculated as shown in equation (7):

$$eEarly(k) = sign(real(y(k))^* - imag(y(k+1))) \quad (7)$$

An example system for implementing the symbol error estimation techniques described herein wherein each sample cycle the late error metric eLate for the previous sample is calculated and the early error metric eEarly for the current sample is calculated is described below with respect to FIG. 12.

Figure 10:
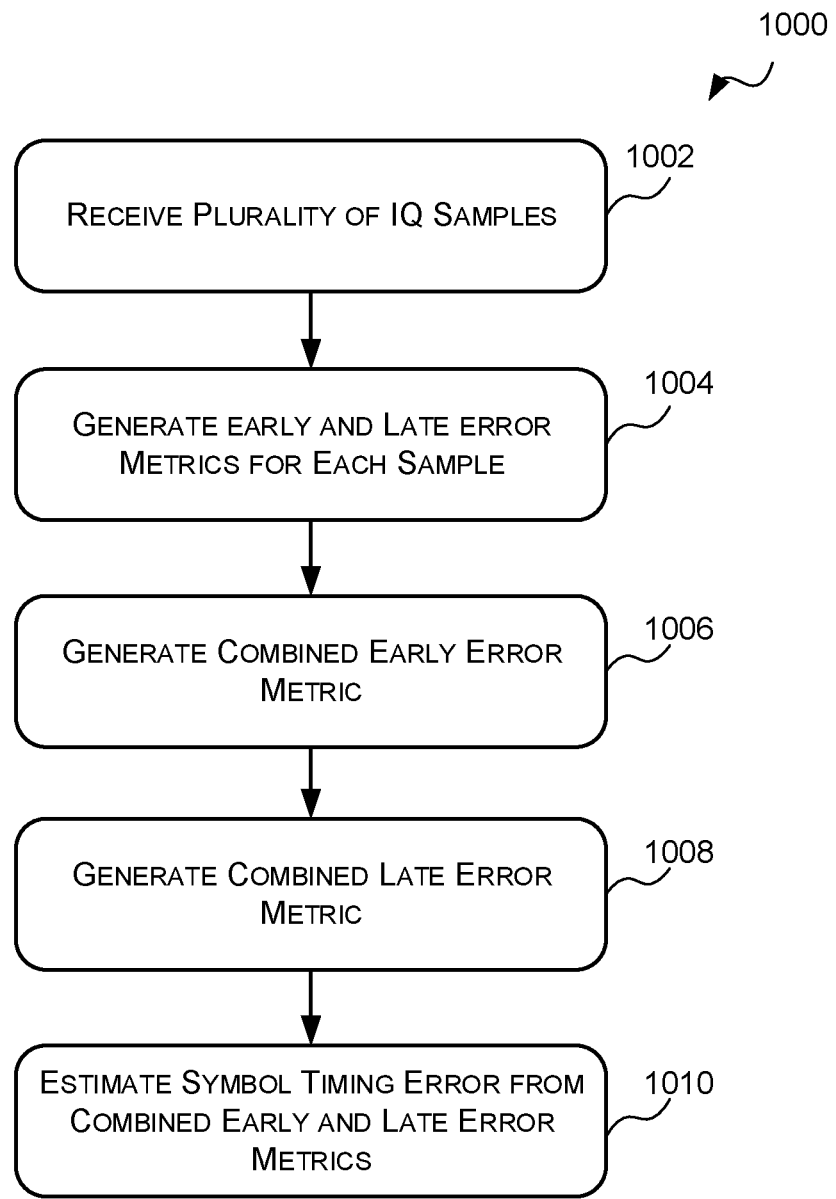
FIG. 10 is a flow diagram of an example method for estimating the symbol timing error of an O-QPSK modulated signal.

Reference is now made to FIG. 10 which illustrates an example method 1000 for estimating the symbol timing error (or sampling timing error) of an O-QPSK signal in accordance with the techniques described above which may be implemented by an O-QPSK symbol timing estimation system in an O-QPSK demodulator or an O-QPSK receiver. The method 1000 begins at block 1002 where the symbol timing estimation system receives a plurality of complex samples (e.g. IQ samples) representing an O-QPSK modulated signal, the complex samples having substantially no imaginary component when sampled on time. In other words, the symbol timing estimation system receives a set of complex samples (e.g. IQ samples) representing an O-QPSK signal after the odd samples have been rotated (e.g. via a phase rotator, such as, the phase rotator 802 described above with respect to FIG. 8) to lie on the real axis (when sampled on time). The method 1000 then proceeds to block 1004.

At block 1004, the symbol timing estimation system generates an early error metric and a late error metric for each sample of the plurality of samples. The early error metric is based on the sign of the real component of the previous sample and the imaginary component of the sample. In some cases, the early error metric may be generated in accordance with equation (2) or equation (7). The late error metric is based on the sign of the real component of the following sample and the imaginary component of the sample. In some cases, the late error metric may be generated in accordance with equation (1). The method 1000 then proceeds to block 1006.

At block 1006, the symbol timing estimation system generates a combined early error metric from the early error metrics for each of the plurality of samples. In some cases, the combined early error metric is generated by summing the early error metrics for the plurality of samples in accordance with equation (4). However, the early error metrics for the plurality of samples may be combined in another suitable manner. As described above, when the sample timing is early then the early error metrics for the plurality of samples will have the same sign; and when the sample timing is late at least two of the early error metrics for the plurality of samples will have different signs. The method 1000 proceeds to block 1008.

At block 1008, the symbol timing estimation system generates a combined late error metric from the late error metrics for each of the plurality of samples. In some cases, the combined late error metric is generated by summing the late error metrics for the plurality of samples in accordance with equation (5). However, the late error metrics for the plurality of samples may be combined in another suitable manner. As described above, when the sample timing is late then the late metrics for the plurality of samples will all be positive; and when the sample timing is early at least two of the late error metrics for the plurality of samples will have different signs. The method 1000 proceeds to block 1010.

At block 1010, the symbol time estimation system generates an estimate of the symbol timing error based on the combined early error metric and the combined late error metric. As described above, where the combined early and late error metrics are generated by summing the early error metrics and late error metrics respectively, the combined early error metric will be larger than the combined late error metric when the sample timing is early, and the combined late error metric will be larger than the combined early error metric when the sample timing is late. Accordingly, in these cases the symbol timing estimation system may estimate the error by calculating the difference between the absolute value of the combined early and late error metrics (e.g. in accordance with equation (6)). The sign of the difference indicates the direction of the error—e.g. when equation (6) is used a positive difference indicates the sample timing is early, and negative difference indicates the sample timing is late—and the magnitude of the difference indicates the magnitude of the error.

The symbol timing estimation system may then be configured to generate a signal based on the estimated error to cause another component, such as the resampler, to adjust the sample timing based on the estimated error. For example, where it is estimated that the sample timing is early the symbol timing estimation system may be configured to generate a signal that causes the resampler to retard or delay the sample timing. Similarly, where it is estimated that the sample timing is late the symbol timing estimation system may be configured to generate a signal that cause the resampler to reduce the sample timing.

In some cases, the symbol timing estimation system may be configured to receive one sample each sample cycle and may be configured to calculate the early and late error metrics by, each sample cycle, calculating the early error metric for the current sample and the late error metric for the previous sample. This may involve storing a received sample for one additional cycle so that it can be used in the subsequent cycle to perform the early and late error calculations. As described above this means that the symbol timing estimation system only has to process to two samples per sample cycle.

Reference is now made to FIG. 11 which illustrates an example application of the method of FIG. 10 to an example set of complex samples representing an O-QPSK modulated signal. In this example, X=8. The original data stream which was used to modulate the O-QPSK signal was {11011001}. If the first bit is an "even" this results in O-QPSK symbols {1, 0+j, −1, 0+j, 1,0−j,−1,−1,0+j}. If the in-phase and quadrature components are sampled late by an amount a then the I/Q samples output from the resampler will be {1+aj, −a+j, −1+aj, a+j, 1−aj, −a−j, −1+aj, a+j}. If these symbols are rotated in accordance with the method set out in Table 1 the rotated samples which are output by the phase rotator and received at the symbol timing estimation system are {1+aj,1+aj,1−aj,−1+aj,1−aj,−1+aj,1−aj,−1+aj}. If the late error metric is generated for each sample in accordance with equation (1) then the late error metric is equal to a for all samples since for all samples the sign of the imaginary component equals the sign of the real part of the next sample (which is what is expected when the sampling is late). If a combined late error metric is generated in accordance with equation (5) then the combined late error metric is equal to 8a since the individual late error metrics are positive. If the early error metric is generated for each sample in accordance with equation (2) then the early error metric is equal to −a for all samples except sample 2 because the sign of the non-error components of the samples on either side are the same. If a combined early error metric is generated in accordance with equation (4) the combined early error metric is equal to −6a since 7 of the early error metrics are negative and one of the early error metrics is positive. It can be seen that the combined late error metric is larger than the combined early error metric indicating that the sampling is late—which is correct.

Figure 12:
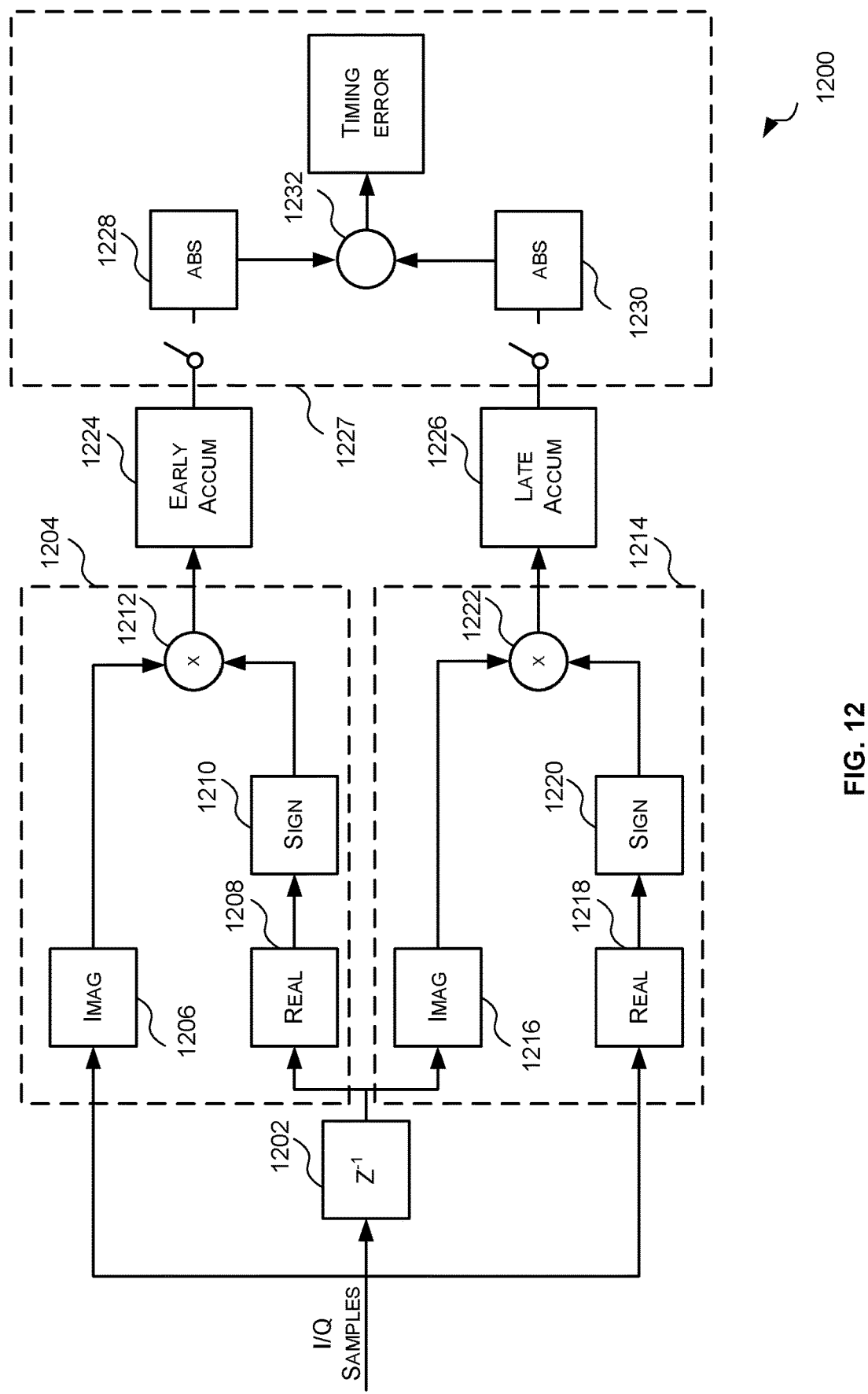
FIG. 12 is a block diagram of an example symbol timing error estimation system for estimating the symbol timing error of an O-QPSK modulated signal in accordance with the method of FIG. 10.

Reference is now made to FIG. 12 which illustrates an example symbol timing estimation system 1200 that is configured to estimate the symbol timing error in accordance with the method 1000 of FIG. 10. The system 1200 is configured to receive a sample each cycle and calculate each cycle an early error metric for that sample and a late error metric for the previous sample, combine the early error metrics and late error metrics for X samples and after X samples determine the difference between the combined early and late error metrics.

The system 1200 comprises a delay block 1202 which, each cycle receives the current sample, and in the next cycle outputs the sample. Accordingly, each cycle the delay block 1202 outputs the previous sample.

The system 1200 also comprises an early error metric generator 1204 which is configured to generate an early error metric for the current sample based on the current sample and the previous sample. In the example of FIG. 12 the early error metric generator 1204 is configured to calculate the early error metric for the current sample in accordance with equation (7). Specifically, the early error metric generator 1204 comprises an imaginary selection component 1206, a real selection component 1208, a sign selection component 1210 and a multiplier 1212. The imaginary selection component 1206 receives the current sample and outputs the imaginary component thereof. The real selection component 1208 receives the previous sample and outputs the real component thereof. The sign selection component 1210 receives the real component of the previous sample and outputs the sign of the real component of the previous sample. The multiplier 1212 multiplies the imaginary component of the current sample and the sign of the real component of the previous sample to generate the early error metric.

The system 1200 also comprises a late error metric generator 1214 which is configured to generate a late error metric for the previous sample based on the current sample and the previous sample. In the example of FIG. 12 the late error metric generator 1214 is configured to calculate the late error metric for the previous sample in accordance with equation (1). Specifically, the late error metric generator 1214 comprise an imaginary selection component 1216, a real selection component 1218, a sign selection component 1220 and a multiplier 1222. The imaginary selection component 1216 receives the previous sample and outputs the imaginary component thereof. The real selection component 1218 receives the current sample and outputs the real component thereof. The sign selection component 1220 receives the real component of the current sample and outputs the sign of the real component of the current sample. The multiplier 1222 multiplies the imaginary component of the previous sample and the sign of the real component of the current sample to generate the late error metric.

The system 1200 also comprises an early error metric combination module 1224 and a late error metric combination module 1226 which are configured to accumulate the late and early error metrics generated by the early and late error metric generators 1204 and 1214. After X samples the accumulated values are output and passed to a sample timing error estimation module 1227 which calculates an estimate of the sample timing error from the accumulated values. In this example the sample timing error estimation module 1227 comprises absolute value modules 1228 and 1230 which output the absolute value of the received accumulated values and a subtraction module 1232 that generates the difference between the absolute values.

The components shown in FIGS. 1, 4, 8, 9, 12 are shown as comprising a number of functional blocks. This is schematic only and is not intended to define a strict division between different logic elements of such entities. Each functional block may be provided in any suitable manner. It is to be understood that intermediate values described herein as being formed by a component need not be physically generated by the component at any point and may merely represent logical values which conveniently describe the processing performed by the component between its input and output.

The O-QPSK symbol timing estimation systems and O-QPSK receivers described herein may be embodied in hardware on an integrated circuit. The O-QPSK symbol timing estimation systems and O-QPSK receivers described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture an O-QPSK symbol timing estimation system or an O-QPSK receiver configured to perform any of the methods described herein, or to manufacture an O-QPSK symbol timing estimation system or an O-QPSK receiver comprising any apparatus described herein. An integrated circuit definition dataset may be, for example, an integrated circuit description.

Therefore, there may be provided a method of manufacturing, at an integrated circuit manufacturing system, an O-QPSK symbol timing estimation system or an O-QPSK receiver as described herein. Furthermore, there may be provided an integrated circuit definition dataset that, when processed in an integrated circuit manufacturing system, causes the method of manufacturing an O-QPSK symbol timing estimation system or an O-QPSK receiver to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an O-QPSK symbol timing estimation system or an O-QPSK receiver will now be described with respect to FIG. 13.

Figure 13:
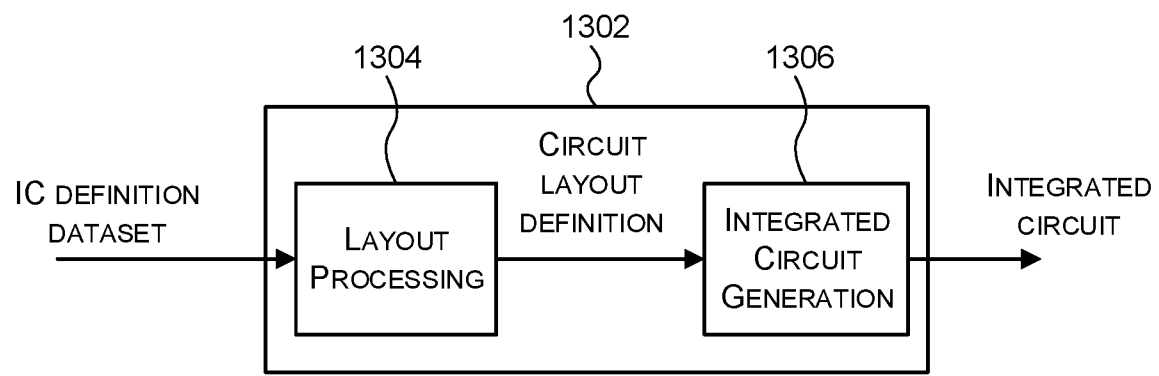
FIG. 13 is a block diagram of an example integrated circuit manufacturing system for generating an integrated circuit embodying the O-QPSK timing error estimation systems or the O-QPSK receivers described herein.

FIG. 13 shows an example of an integrated circuit (IC) manufacturing system 1302 which is configured to manufacture an O-QPSK symbol timing estimation system or an O-QPSK receiver as described in any of the examples herein. In particular, the IC manufacturing system 1302 comprises a layout processing system 1304 and an integrated circuit generation system 1306. The IC manufacturing system 1302 is configured to receive an IC definition dataset (e.g. defining an O-QPSK symbol timing estimation system or an O-QPSK receiver as described in any of the examples herein), process the IC definition dataset, and generate an IC according to the IC definition dataset (e.g. which embodies an O-QPSK symbol timing estimation system or an O-QPSK receiver as described in any of the examples herein). The processing of the IC definition dataset configures the IC manufacturing system 1302 to manufacture an integrated circuit embodying an O-QPSK symbol timing estimation system or an O-QPSK receiver as described in any of the examples herein.

The layout processing system 1304 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1304 has determined the circuit layout it may output a circuit layout definition to the IC generation system 1306. A circuit layout definition may be, for example, a circuit layout description.

The IC generation system 1306 generates an IC according to the circuit layout definition, as is known in the art. For example, the IC generation system 1306 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1306 may be in the form of computer-readable code which the IC generation system 1306 can use to form a suitable mask for use in generating an IC.

The different processes performed by the IC manufacturing system 1302 may be implemented all in one location, e.g. by one party. Alternatively, the IC manufacturing system 1302 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an O-QPSK symbol timing estimation system or an O-QPSK receiver without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 13 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 13, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of estimating a symbol timing error for an offset quadrature phase shift keying (O-QPSK) modulated signal, the method comprising:
   receiving a set of phase rotated complex samples representing the O-QPSK modulated signal, the set of phase rotated complex samples having been generated by sampling a representation of the O-QPSK modulated signal at an O-QPSK symbol rate to generate an initial set of complex samples and applying a phase rotation to one or more of the samples in the initial set of complex samples such that if the representation of the O-QPSK modulated signal is sampled on time each sample in the set of phase rotated complex samples has substantially no imaginary component;
   generating an early error metric and a late error metric for each sample in the set of phase rotated complex samples, the early error metric based on the imaginary component for a sample in the set and a sign of a real component of a previous sample in the set with respect to the sample for which the early error metric is being generated, and the late error metric based on the imaginary component for a sample in the set and a sign of a real component of a following sample in the set with respect to the sample for which the late error metric is being generated;
   generating a combined early error metric based on the early error metrics for the samples in the set of phase rotated complex samples;
   generating a combined late error metric based on the late error metrics for the samples in the set of phase rotated complex samples; and
   generating an estimate of the symbol timing error based on the combined early error metric and the combined late error metric.

2. The method of claim 1, wherein:
   the set of phase rotated complex samples comprises X samples, wherein X is an integer greater than or equal to two;
   each complex sample in the set of phase rotated complex samples corresponds to an O-QPSK symbol; and
   a sequence of X O-QPSK symbols of the O-QPSK modulated signal comprises at least one value of k wherein the $k^{th}$ and the $k+2^{th}$ O-QPSK symbols in the sequence are the same and at least one value of k wherein the $k^{th}$ and $k+2^{th}$ O-QPSK symbols in the sequence are different, wherein k is an integer greater than or equal to 0.

3. The method of claim 1, wherein one sample is received each sample cycle, and generating an early error metric and a late error metric for each sample comprises, generating each sample cycle, the early error metric for the sample received in a current cycle and the late error metric for the sample received in the previous cycle.

4. The method of claim 1, wherein the early error metric for a sample is generated by multiplying the sign of the real component of the previous sample in the set with respect to the sample for which the early error metric is being generated and the imaginary component of the sample.

5. The method of claim 1, wherein the late error metric for a sample is generated by multiplying the sign of the real component of the following sample in the set with respect to the sample for which the late error metric is being generated and the imaginary component of the sample.

6. The method of claim 1, wherein the combined early error metric is generated by summing the early error metrics for the set of phase rotated complex samples.

7. The method of claim 1, wherein the combined late error metric is generated by summing the late error metrics for the set of phase rotated complex samples.

8. The method of claim 1, further comprising:
   receiving the initial set of complex samples, wherein when the representation of the O-QPSK modulated signal is sampled on time one or more of the complex samples in the initial set of complex samples comprises substantially no real component; and
   generating the set of phase rotated complex samples from the initial set of complex samples by rotating the one or more complex samples in the initial set of complex samples so that when the representation of the O-QPSK modulated signal is sampled on time the one or more complex samples have substantially no imaginary component.

9. The method of claim 8, wherein generating the set of phase rotated complex samples from the initial set of complex samples comprises rotating each sample in the initial set of complex samples by (n mod 4)*90 degrees wherein n is a sample number.

10. The method of claim 2, wherein the O-QPSK modulated signal is an IEEE 802.15.4 signal and X is equal to an integer multiple of thirty-two.

11. The method of claim 1, further comprising generating a timing adjustment signal that causes a sample timing of the representation of the O-QPSK modulated signal to be adjusted based on the estimate of the symbol timing error.

12. A non-transitory computer readable storage medium having stored thereon computer readable code which when executed by a computer cause the computer to perform the method as set forth in claim 1.

13. An offset quadrature phase shift keying (O-QPSK) symbol timing estimation system comprising:
   an early error metric generator configured to generate an early error metric for each sample in a set of phase rotated complex samples that represent an O-QPSK modulated signal, the set of phase rotated complex samples having been generated by sampling a representation of the O-QPSK modulated signal at an O-QPSK symbol rate to generate an initial set of complex samples and applying a phase rotation to one or more of the samples in the initial set of complex samples such that when the representation of the O-QPSK modulated signal is sampled on time each sample in the set of phase rotated complex samples comprises substantially no imaginary component, the early error metric based on an imaginary component of a sample in the set and a sign of a real component of a previous sample in the set with respect to the sample for which the early error metric is being generated;

a late error metric generator configured to generate a late error metric for each sample in the set of phase rotated complex samples, the late error metric based on an imaginary component of a sample in the set and a sign of a real component of a following sample in the set with respect to the sample for which the late error metric is being generated;

an early error metric combination module configured to generate a combined early error metric based on the early error metrics for the samples in the set of phase rotated complex samples;

a late error metric combination module configured to generate a combined late error metric based on the late error metrics for the samples in the set of phase rotated complex samples; and a sample timing error estimation module configured to estimate a sample timing error based on the early and late combined error metrics.

14. The system of claim 13, wherein:

the set of phase rotated complex samples comprises X samples, wherein X is an integer greater than or equal to two;

each complex sample in the set of phase rotated complex samples corresponds to an O-QPSK symbol; and a sequence of X O-QPSK symbols of the O-QPSK modulated signal comprises at least one value of k wherein the $k^{th}$ and the $k+2^{th}$ O-QPSK symbols in the sequence are the same and at least one value of k wherein the $k^{th}$ and $k+2^{th}$ O-QPSK symbols in the sequence are different, wherein k is an integer greater than or equal to 0.

15. The system of claim 13, wherein the system receives one sample each sample cycle, and in each sample cycle the early error metric generator is configured to generate the early error metric for the sample received in the current sample cycle and the late error metric generator is configured to generate the late error metric for the sample received in the previous sample cycle.

16. The system of claim 15, further comprising a delay module configured to receive a sample each sample cycle and provide that sample to the early error metric generator and the late error metric generator in the next sample cycle.

17. An O-QPSK receiver comprising:

the O-QPSK symbol timing estimation system as set forth in claim 13; and a phase rotator configured to:

receive the initial set of complex samples, wherein when the representation of the O-QPSK modulated signal is sampled on time one or more of the complex samples in the initial set of complex samples comprises substantially no real component; and generate the set of phase rotated complex samples from the initial set of complex samples by rotating the one or more complex samples in the initial set of complex samples so that when the representation of the O-QPSK modulated signal is sampled on time the one or more complex samples have substantially no imaginary component.

18. The O-QPSK receiver of claim 17, wherein the phase rotator is configured to generate the set of phase rotated complex samples from the initial set of complex samples by applying a phase rotation of (n mod 4)*90 degrees to each sample in the initial set of complex samples wherein n is a sample number.

19. The O-QPSK symbol timing estimation system of claim 13, wherein the O-QPSK symbol timing estimation system is embodied in hardware on an integrated circuit.

20. A non-transitory computer readable storage medium having stored thereon a computer readable description of the O-QPSK symbol timing estimation system as set forth in claim 13 that, when processed in an integrated circuit manufacturing system, causes the integrated circuit manufacturing system to manufacture an integrated circuit embodying the O-QPSK symbol timing estimation system.

* * * * *